June 9, 1936.   D. T. BROWNLEE   2,043,695
OVERRUNNING CLUTCH
Filed April 6, 1932

Inventor:
Dalmar T. Brownlee,
By: Arthur M. Nelson
Atty.

Patented June 9, 1936

2,043,695

UNITED STATES PATENT OFFICE 2,043,695

OVERRUNNING CLUTCH

Dalmar T. Brownlee, Indianapolis, Ind., assignor, by mesne assignments, to William C. Starkey, Raymond S. Pruitt, and Walter H. Beal, trustees Application April 6, 1932, Serial No. 603,456

7 Claims. (Cl. 192—41)

This invention relates to improvements in overrunning clutches and it consists of the matters hereinafter described and more particularly pointed out in the appended claims.

The clutch with which the invention is more particularly concerned is of the kind employing a helical spring as the element operable in a relative rotative movement between the coacting clutch members in one direction, to clutch said members together.

In a clutch of this kind, a certain amount of lost motion must be taken up in order to provide the necessary driving action. It has been found that in the operation of an overrunning clutch of this kind, the overrunning friction between the gripping surfaces of the spring and clutch member, is sufficient to reduce the effective diameter of the spring to a considerable extent. In some cases with spring clutches as heretofore constructed, such diameter has been reduced as much as 14/1000 of an inch below its normal diameter in a 2½ inch diameter spring. By normal diameter, is meant that diameter to which the spring returns when unrestrained in any manner.

As a result of this reduction in diameter of the spring below its normal diameter, it is apparent that in order to pick up the load between the driving and driven members of the clutch, said spring must first function to take up the increased clearance as produced by said reduced diameter. This taking up of the increased clearance of the spring and is readily observable in an automobile wherein a clutch of this kind is used as the free wheeling unit therefor. This taking up of said clearance produces a peculiar sound or noise, sometimes manifesting itself with a "click" or "cluck" and is sufficient to attract the operator's attention and in this sense, is undesirable.

The result of this action is that when establishing driving action after coasting or free wheeling, as it is quite often termed, the engine accelerates to a speed considerably beyond that of the propeller shaft so that the gripping action occurs at a considerable differential in rotative speeds which induces a readily discernible impact, slap or blow of the spring against its coacting clutch surface.

Difficulty has been encountered in making springs for this purpose, which are truly cylindrical in shape to coact with their associated clutching surface. Experiments have demonstrated that when the metal is rolled, drawn or otherwise made to form spring stock as a "wire" for subsequent winding into spring form, certain internal stresses or forces are set up therein. These stresses or forces which are different at different points along the spring stock are confined or resisted by the enveloping surface or skin of such stock. Thus when a spring is ground to size, said surface or skin is ground away and this releases said stresses or forces which manifest themselves or show up in said grinding operation as high spots or areas. Furthermore, when the springs are ground upon a centerless grinder as is now the custom, the spring vibrates or chatters and this accentuates said spots or areas so that if the spring is examined under a microscope, the ground surface shows up as a many sided polygon instead of being truly cylindrical.

It has been attempted to grind such springs upon a mandrel from which the spring is later removed for assembly in a clutch. However, so soon as a ground spring is removed from the mandrel which provides the internal support for such a grinding operation, said stresses and strains exert themselves in the different convolutions of the spring. With such stresses being variable in character, they cannot be predetermined so that both in the centerless grinding of a spring or the grinding of such a spring upon a mandrel with a subsequent removal of the spring therefrom, the result is an irregular and not a truly cylindrical spring.

The primary object of the present invention is to provide a clutch which overcomes the action above described and to this end the internal diameter of the clutch spring is positively limited by an internal support and therefore, cannot be contracted beyond the desired limit, thus retaining the desired outside diameter of said spring as originally made and with indeed but a slight clearance with its associated clutch surface so that a free overrunning is possible due to maintaining said clearance to the limits originally intended.

Another object of the invention relates to the process of making the clutching spring by changing the diameter of the spring and sleeve-like member which in the assembled clutch constitutes one of the elements thereof and supports the spring during the grinding operation. Therefore, as the spring has been slightly changed from its normal diameter and is supported in this changed condition, and is then ground, the spring is prevented from modifying in any way, the shape or position of its convolutions and a truly cylindrical spring, devoid of high spots, is obtained.

Another object of the present invention relates more particularly to the process of making the clutching spring by expanding the spring upon a sleeve-like member, which in the assembled clutch constitutes one of the elements thereof and internally supports the spring during the grinding operation. Therefore, as the spring has been slightly expanded from its normal diameter and is supported in this condition and is then ground, said spring has no opportunity to modify in any way, the shape or position of the convolutions of the spring and a truly cylindrical spring devoid of high spots, is insured.

A further object of the present invention is to provide a clutch of this kind of the single pocket type wherein overall dimensions in length are reduced without sacrificing efficiency and wherein a positive drive is applied to one end of the spring by inducing a compression action thereon in a confined space and a frictional grip or drive is applied to the driven member.

The above mentioned objects of the invention, as well as others, together with the many advantages thereof, will more fully appear as I proceed with my specification.

Figure 1:
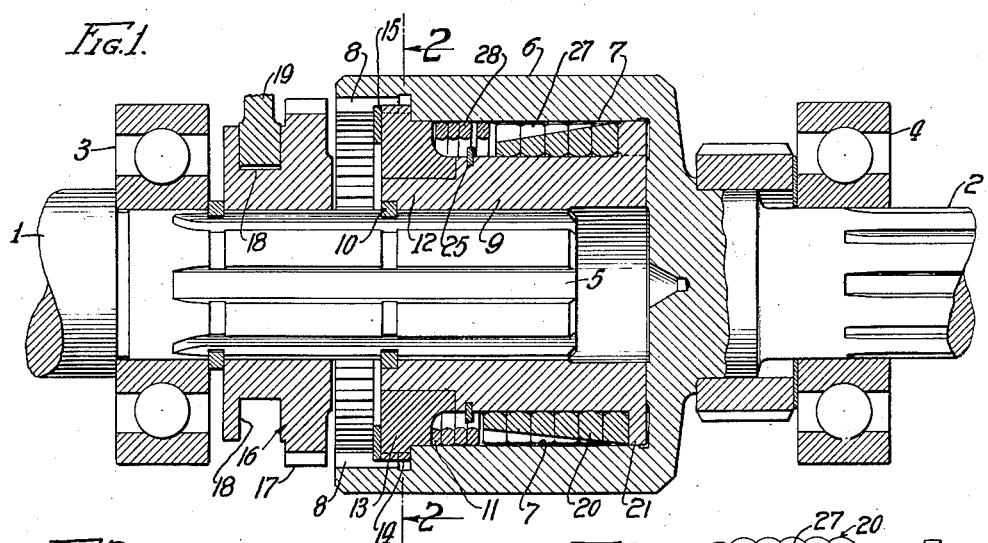
Fig. 1 is a longitudinal vertical sectional view through an overrunning clutch embodying my invention.
Figure 2:
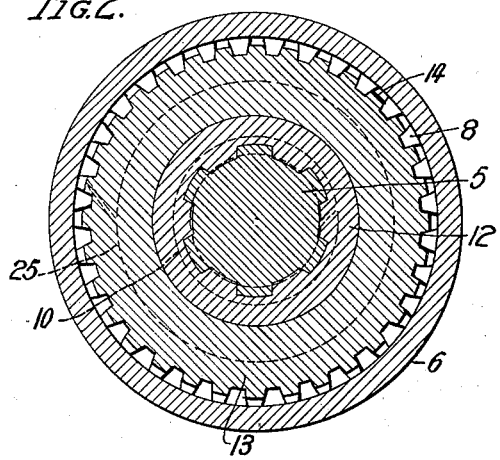
Fig. 2 is a transverse vertical section through the same as taken on the line 2—2 of Fig. 1.

In the embodiment of the invention illustrated in the drawing, 1 indicates the driving shaft of the clutch and 2 indicates the coaxial driven shaft thereof. When the clutch as a whole is employed as a free wheeling unit in connection with an automobile transmission, then said shaft 1 constitutes the main driven shaft of the transmission and the shaft 2 constitutes the secondary driven shaft thereof, adapted to be operatively connected to the usual propeller shaft. Each shaft as herein shown is journalled in suitable anti-friction bearings 3 and 4 respectively which of course, are mounted in the usual casings (not shown).

The driving shaft 1 has a splined end 5 extending rearwardly beyond the bearing 3 and the driven shaft 2 is formed on its front end with an integral cup-like clutch member 6 which overhangs or surrounds a portion of, but is spaced radially from the splined end of the driving shaft. Said cup member is formed with an internal, cylindrical clutch surface 7 which terminates short of the open front end of said clutch member which is there formed to provide internal spline teeth 8 the purpose of which will appear later.

9 indicates a sleeve which is splined upon the rear portion of the end 5 of the driving shaft. Said sleeve is held in place with its rear end in substantial engagement with the rear end wall of the clutch member 6 by means of a spring locking ring 10 associated with the front end of the sleeve and engaged in an annular groove in said splined end of the driving shaft. The sleeve 9 is of a diameter less than that of the clutch surface 7 and coacts therewith to define an annular clutch spring recess 11 the purpose of which will soon appear.

The front end of the sleeve 9 is reduced in diameter to provide a shouldered hub 12 upon which is mounted a bearing ring or bushing 13. Said bushing is externally splined at its front end as at 14 to engage in the spaces between the splined teeth 8 of the clutch member and is held against endwise displacement by means of a spring locking ring 15 engaged in a suitable annular groove provided therefor in the front end of said cup-like clutch member. Thus the bushing turns with the clutch member 6 and provides the rotative bearing for the front end thereof.

Between the antifriction bearing 3 and the front end of the clutch member 6 and splined on the end 5 of the driving shaft is a longitudinally shiftable, positive clutch member 16. One end of said clutch member 16 has external spline teeth 17 to match those in the associated front end of the clutch member 6, and the rear end of said positive clutch member is formed with an annular groove 18 to receive a yoke 19 by means of which said positive clutch member is longitudinally shifted.

Associated with and non-rotatively mounted on the sleeve 9 is the main clutch spring 20 which is externally ground flat to cooperate with the clutch surface 7. When said spring is in its normally unstressed position it has a slight clearance with respect to said clutch surface and such a clearance normally approximates about 4/1000 of an inch in a spring of about 2½ inches in outside diameter.

On the rear end of said sleeve is a radial flange 21 complete in continuity except for a gap or recess 22 which forms arcuately spaced, oppositely facing shoulders of different longitudinal dimensions. The front surface 23 of said flange is made to form a substantially complete helix which corresponds in inclination to the lead of the spring 20 so that the last convolution of said spring rests squarely and flat against said surface 23. The end of said last convolution is formed to provide a toe 24 which snugly engages in the recess 22 so that said end of the spring is positively connected to said sleeve. To prevent endwise displacement of the spring away from said flange, a spring ring 25 is disposed in an annular groove 26 in said sleeve and this ring substantially engages with the other or front end of the clutch spring. To make the front end of said clutch spring more flexible in character, arcuately spaced, gradient grooves 27 are formed in the external periphery of said spring, said grooves being the deepest at and opening through the front end of said spring.

Figure 4:
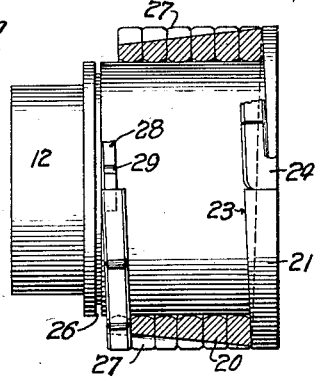
Fig. 4 is a view similar to Fig. 3 after the spring has been positioned and has been ground upon its associated internal supporting sleeve and which sleeve and spring is thereafter assembled as a unit in the clutch.

Associated with the front end of the clutch spring 20 is an energizing spring 28 made of smaller cross sectional and more flexible stock. This energizing spring is of a diameter greater than that of the main clutch spring and I find that about a $\frac{1}{32}$ of an inch greater diameter will suffice, in a clutch spring having the outside diameter before mentioned. The rear end of said energizing spring is anchored in the front end of the main clutch spring in any suitable manner and its front end is unattached to any other element of the clutch but has a slight frictional engagement with the clutch surface 7, so that it is substantially free in its movement. If desired to render said energizing spring more flexible, it too may be provided in its convolutions with notches 29, only one of which appears in Fig. 4.

As before stated, difficulty is developed in making a clutch spring having a substantially true cylindrical gripping surface as distinguished from the many sided polygonal surface. In order to meet and overcome this difficulty, the spring 20 in the original winding or making thereof is made with an internal diameter somewhat less than the external diameter of the sleeve 9. I find that with said internal diameter of said spring about 15/1000 of an inch less than that of the external diameter of the sleeve, the intended results follow.

Figure 3:
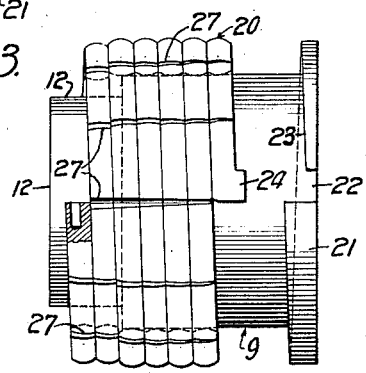
Fig. 3 is a view in side elevation of one of the elements of the clutch affording the internal support for the associated clutch spring which is illustrated as being expanded in place upon said element for purpose of being ground while in place thereon.
Figure 5:
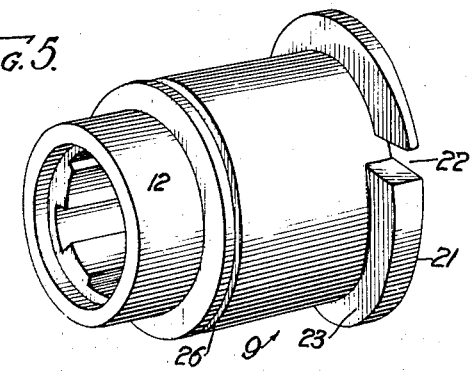
Fig. 5 is a perspective view of the sleeve-like element providing the internal support for the spring and upon which the spring is first expanded and then ground.

After the toe 24 has been formed, thereon, but before the energizing spring 28 has been applied, said spring is expanded and then applied with the toe end first, upon the front or hub end of the sleeve as best shown in Fig. 3 which shows the expansion of all of the convolutions of the spring except the front end one which is just about to slip over the hub shouldered end of said sleeve. When the spring has been fully positioned upon said sleeve, its rearmost convolution engages squarely against the surface 23 of the flange 21 and the toe 24 engages in the recess 22.

With the spring thus positioned on the sleeve, it is apparent that it is internally supported in a somewhat expanded condition. The sleeve with the spring now mounted thereon is then employed as an arbor upon which the spring is externally ground upon a center grinder. In the grinding operation on the spring, that surface or the "skin" of the various convolutions which acted to hold the stresses in control, is ground away but due to the internal support afforded the spring by the sleeve such stresses cannot exert themselves in a manner providing high spots or areas in said surface so that the ground surface is substantially truly cylindrical. In grinding such a spring of say said 2½ inch diameter before mentioned, it is ground down to such an extent that when embodied in a clutch, it will have about 4/1000 of an inch clearance with respect to the associated clutch surface 7. As to forming the gradient grooves 27 in said spring this is preferrably done before grinding and may be done either before or after expanding the spring upon the sleeve.

After the spring has thus been ground upon the sleeve, the energizing spring 28 is applied thereto and this application of the energizing spring may be carried out either before or after the retaining ring 25 is placed in position. This energizing spring is about 1/32 of an inch larger in external diameter than that of the clutch spring and when the sleeve with the springs thereon, is assembled in the clutch, the external surface of the energizing spring will have a light frictional drag on its associated part of the clutch surface.

In operation, when the driving shaft is rotating at a speed greater than that of the driven shaft, in the proper direction, the sleeve will tend to carry the toed end of the spring with it. As the energizing spring is exerting a slight drag on the surface 7, this will hold the associated end of the clutch spring, so that the main clutch spring is unwound and is radially expanded into a gripping action with said surface 7. Thus the toed end of the spring is placed under a compressive strain under the driving influence of the sleeve and this provides a positive connection between the driving shaft and spring and a frictional engagement between the spring and clutch member 6. However, it is pointed out that as the toed end of the spring is completely surrounded on one side by the flange 21, on the other side by the next convolution of the spring and internally by the sleeve 9 and externally by the clutch member 6, it is amply reinforced or backed up against any flexing or movement tending to disrupt or fracture the same.

Should the driven shaft 2 and clutch member 6 tend to rotate at a speed greater than that of the driving shaft, the clutch member 6 through the energizing spring will act to wind up the clutch spring and reduce its diameter to again establish clearance between the clutch spring and surface 7 so that said driven shaft and clutch member may overrun the driving shaft. Should it be desired to lock out the action of the clutch spring, the clutch member 16 is shifted toward and into the open front end of the clutch member 6 so that said clutch members 6 and 16 are positively connected together. Furthermore, when it is desired to drive the shaft 2 from the shaft 1 in a reverse direction, said clutch member must be actuated to lock out the action of the spring and positively connect said shafts together as before mentioned.

With the clutch spring internally supported as described, the normal clearance between said spring and clutch surface 7 can be held to closer tolerances without a dragging action and resultant wear. Thus when the driving shaft again rotates at a speed greater than that of the driven shaft, it operates instantly but smoothly to pick up the load of the driven shaft so that there is no lost motion to be taken up with the usual resulting "click" or slapping noise.

The expanding of the clutch spring upon the associated sleeve and subsequent grinding thereof, insures a substantially true circular spring having a better frictional grip on the clutch surface 7 so that the said spring is more positive and quicker in its gripping action.

The clutch described comprises but a relatively few parts which are not only strong and rigid but which are simple to make and easy to assemble and which clutch is materially reduced in overall axial length, the latter being of especial advantage when the clutch as a whole is employed as the free wheeling unit in an automobile.

While in describing the invention, I have referred in detail to the form, arrangement and construction of the parts thereof, as well as to the steps in grinding the spring while upon its sleeve, the same is to be considered as illustrative only so that I do not wish to be limited thereto except as is specifically set forth in the appended claims.

I claim as my invention:—

1. An overrunning clutch of the character described comprising, in combination, a driving shaft, a coaxially arranged driven shaft, a sleeve fixed on said driving shaft, a cup-like clutch member rotative with said driven shaft and normally surrounding but radially spaced from said sleeve to provide an annular space between said sleeve and cup-like clutch member, said cup-like clutch member being formed to provide an internal clutch surface, a ring rotative with one end of said cup-like clutch member and journalled on said sleeve and acting to close the associated end of said annular space, a clutch spring in said space and internally supported upon said sleeve against contraction but fixed at one end thereto so as to rotate therewith and normally free from said clutch surface, and an energizing spring associated with the other end of the clutch spring and operative in response to relative rotation between said shafts in one direction to expand the clutch spring into gripping relation with the clutch surface in order to clutch the two members together for conjoint rotation.

2. An overrunning clutch of the character described comprising, in combination, two relatively rotatable, inner and outer, radially spaced members, said outer member being formed to provide an internal clutch surface and said inner member having a notched radial flange at one end provided with a helical face, a helical clutch spring disposed in the space between said members and normally free from said clutch surface but supported upon the inner member against a contraction in its diameter, one end of said spring fitting directly against and conforming to the helical face of said flange and having a part extending longitudinally of the spring and into the notch in the flange so that said spring will rotate with said inner member, and means associated with the other end of said spring and operative in response to relative rotation between said members in one direction for causing said spring to transmit a torque between said members and expand into clutching engagement with said clutch surface.

3. Those steps in the manufacture of an overrunning clutch which consist in providing a coiled clutch spring and a coacting mounting member, expanding said spring upon the mounting member whereby the inner surface of said spring grips upon the same and then grinding the outer surface of said spring.

4. Those steps in the manufacture of an overrunning clutch which consist in providing a coiled clutch spring and a coacting mounting member, expanding said spring upon the mounting member whereby the inner surface of said spring grips upon the same, grinding the outer surface of the spring and then assembling the ground spring and its mounting member as a unit with other associated elements of the clutch, one of which has a ground clutch surface for coacting with the ground surface of said spring.

5. An overrunning clutch of the character described comprising in combination, a pair of coaxial, rotatable shafts, a clutch member connected for rotation with one of the shafts and having an external cylindrical periphery, a complemental, cup-shaped clutch member connected for rotation with the other shaft and having an internal cylindrical periphery surrounding but spaced radially from the external cylindrical periphery of the member connected to said one shaft and forming with said external periphery an annular space between the two members, a helical clutch spring disposed in said annular space and connected at one end thereof for rotation with one of the members, said spring being arranged so that during rotation of said one clutch member in one direction relatively to the other member it is spaced from the cylindrical periphery of said other member and leaves the two members in unclutched relation and being of such normal diameter with respect to the cylindrical periphery of the member to which it is connected that it grips and presses firmly against said last mentioned periphery when the members are in said unclutched relation, and an energizing helical spring engaging frictionally the cylindrical periphery of said other clutch member and applied to the other end of the clutch spring so that it operates in response to rotation of said one clutch member in the opposite direction relatively to said other clutch member to twist the spring into gripping relation with the cylindrical periphery of said other member and thus to clutch the two members together for conjoint rotation.

6. An overrunning clutch of the character described comprising in combination, a rotatable clutch member and a relatively rotatable complemental clutch member extending around and spaced radially from the first mentioned member and forming therewith an annular space between the two members, a radially extending flange connected to one of the clutch members and having a helical face and a transverse recess therein, and a helical clutch spring disposed in the annular space between the two members and having one of the end convolutions thereof fitting against the helical face of the flange and provided with a lug part fitting in the recess in the flange so that the spring is connected to said one clutch member for rotation therewith, said spring being arranged so that when said one clutch member rotates in one direction relatively to the other member it is free or unclutched with respect to said other member and forms no driving connection between the two members, but when said one clutch member is rotated in the opposite direction relatively to the other clutch member it is expanded into locking relation with the other and clutches the two members together for conjoint rotation.

7. Those steps in the manufacture of an overrunning clutch which consist in applying a helical clutch spring to the cylindrical periphery of a clutch-member so that it grips and presses firmly against the periphery thereof, and then grinding the exposed longitudinal face of the spring while the spring remains in gripping relation with the clutch member.

DALMAR T. BROWNLEE.